(12) United States Patent
Xue et al.

(10) Patent No.: US 10,812,633 B2
(45) Date of Patent: Oct. 20, 2020

(54) INFORMATION TRANSMISSION METHOD AND APPARATUS AND ELECTRONIC EQUIPMENT

(71) Applicant: FUJITSU LIMITED, Kawasaki-shi, Kanagawa (JP)

(72) Inventors: Wenqian Xue, Beijing (CN); Hao Wang, Beijing (CN); Su Yi, Beijing (CN); Xiaojing Fan, Beijing (CN); Lefei Wang, Beijing (CN); Ryuichi Matsukura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/007,716

(22) Filed: Jun. 13, 2018

(65) Prior Publication Data
US 2018/0375970 A1 Dec. 27, 2018

(30) Foreign Application Priority Data

Jun. 21, 2017 (CN) .......................... 2017 1 0491851

(51) Int. Cl.
*H04L 29/08* (2006.01)
*H04L 12/751* (2013.01)
*H04W 40/24* (2009.01)
*H04L 12/721* (2013.01)

(52) U.S. Cl.
CPC ............ *H04L 69/324* (2013.01); *H04L 45/02* (2013.01); *H04W 40/24* (2013.01); *H04L 45/66* (2013.01)

(58) Field of Classification Search
CPC .. H04L 12/2807; H04W 84/18; H04W 40/24; H04W 8/005; H04W 40/246; H04W 40/248
See application file for complete search history.

(56) References Cited

U.S. PATENT DOCUMENTS

| 9,660,897 B1 * | 5/2017 | Gredler .................. H04L 45/50 |
| 2007/0291665 A1 | 12/2007 | Hauenstein et al. |
| 2010/0316030 A1 | 12/2010 | Venkatachalam et al. |

(Continued)

FOREIGN PATENT DOCUMENTS

| CN | 101536410 A | 9/2009 |
| CN | 102122973 A | 7/2011 |

(Continued)

OTHER PUBLICATIONS

Author Unknown, DCB Capability Exchange Protocol Specification, Rev 1.0, pp. 1-41, 2013 (Year: 2013).*

(Continued)

*Primary Examiner* — Christopher M Crutchfield
(74) *Attorney, Agent, or Firm* — Arent Fox LLP (57) ABSTRACT

Embodiments of this disclosure provide an information transmission method and apparatus and electronic equipment. The information transmission method apparatus is used for transmitting a network topology information frame (TI frame) of network topology information, the apparatus including: a transmitting/receiving unit configured to transmit and/or receive a media access control (MAC) layer frame of a network protocol; the network topology information frame (TI frame) is loaded into a payload of the MAC layer frame. According to this disclosure, transmission modes of the network topology information may be made more flexible.

11 Claims, 3 Drawing Sheets

(56) References Cited

U.S. PATENT DOCUMENTS

2011/0038358 A1    2/2011  Etemad
2011/0261704 A1   10/2011  Wang et al.
2012/0213062 A1    8/2012  Liang et al.
2015/0003259 A1    1/2015  Gao
2017/0302567 A1*  10/2017  Lan ...................... G06F 11/076

FOREIGN PATENT DOCUMENTS

CN    102461117 A    5/2012
CN    103384988 A   11/2013
CN    104081731 A   11/2013
CN    103595640 A    2/2014
TW    201106755 A1   2/2011

OTHER PUBLICATIONS

Author Unknown, ISO 8583—A Layman's Guide to Understanding the ISO 8583 Financial Transaction Message, Jun. 2013, pp. 1-7 (Year: 2013).*
Author Unknown, IEEE 802.1AB, 2016, pp. 1-146 (Year: 2016).*
Author Unknown, ISO 8583-1, pp. 1-204, 2003 (Year: 2003).*
Home-network Topology Identifying Protocol (HTIP), The Telecomuunication Technology Committee, pp. 1-27, Aug. 30, 2010.
Malisa Vucinić, et al., "Topology Construction in RPL Networks over Beacon-Enabled 802.15.4", Apr. 30, 2014.
Chinese Office Action issued by the Chinese Patent Office in corresponding Chinese Patent Application No. 201710491851.4, dated Jul. 30, 2020.

* cited by examiner

| | | | 401 | | | | | 402 |
|---|---|---|---|---|---|---|---|---|
| Bits: 1 | 1 | 1 | 1 | 1 | 1 | 1 | 1 | |
| TI Information1 Present | TI Information2 Present | TI Information3 Present | TI Information4 Present | 0 | TI Information6 Present | TI Information7 Present | 0 | |

| | | | | | | | | 502 |
|---|---|---|---|---|---|---|---|---|
| 50a | Bits: 1 | 1 | 1 | 1 | 1 | 1 | 1 | 1 |
| | TI Information1 Present | TI Information2 Present | TI Information3 Present | TI Information4 Present | 0 | TI Information6 Present | TI Information7 Present | 1 |
| 50b | Bits: 1 | 1 | 1 | 1 | 1 | 1 | 1 | 1 |
| | TI Information8 Present | 0 | TI Information10 Present | Reserved | Reserved | Reserved | Reserved | Reserved |
| | 501 | 501 | 501 | 503 | 503 | 503 | 503 | 503 |

Fig. 5

| Bits: 1 | 1 | 1 | 1 | 1 | 1 | 1 | 1 |
|---|---|---|---|---|---|---|---|
| Chassis ID present | Port description present | TTL present | Device category present | Manufacturer code present | Model name present | Model number present | 0 |

Fig. 6

| Bits: 1 | 1 | 1 | 1 | 1 | 1 | 1 | 1 |
|---|---|---|---|---|---|---|---|
| Chassis ID present | Port description present | TTL present | Device category present | Manufacturer code present | Model name present | Model number present | 1 |
| 1 | 1 | 1 | 1 | 1 | 1 | 1 | 1 |
| Link info present | MAC address list present | reserved | reserved | reserved | reserved | reserved | reserved |

INFORMATION TRANSMISSION METHOD AND APPARATUS AND ELECTRONIC EQUIPMENT

CROSS-REFERENCE TO RELATED APPLICATIONS

This application claims priority from Chinese Patent Application No. 201710491851.4 filed Jun. 21, 2017. The entire contents of this application is incorporated herein by reference.

TECHNICAL FIELD

This disclosure relates to the field of communications technologies, and in particular to an information transmission method and apparatus and electronic equipment.

BACKGROUND

As increasing development of intelligent household technologies, more and more automated apparatuses, such as a lamp switch, a drench system, and an air-conditioning system, etc., are introduced into household networks.

For household networks to be convenient for maintenance, protocols used for identifying household network topology may be set. Based on these protocols, topology information on the household networks may be transmitted between devices in the household networks, and based on the topology information, topologies of the household networks may be generated. The topology information on the household networks, for example, may include information on the devices in the household networks and link information between the devices.

According to the above protocols used for identifying household network topology, the topology information on the household networks may be transmitted based on a link layer discovery protocol (LLPD) and in a form of an Ethernet frame.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a case where the topology information on the household networks is transmitted in a form of an Ethernet frame, it is required that the devices in the household networks support the Ethernet link. For those devices not supporting the Ethernet, it is required that these devices support IP communications, and data link information of them is transmitted after being encapsulated, and this also requires that these devices support an IP communications protocol and an encapsulation protocol. Hence, devices are more constrained by existing transmission modes of topology information on household networks, and more processing overhead will be introduced along with an encapsulation process, thereby increasing operating loads of the devices.

Embodiments of this disclosure provide an information transmission method and apparatus and electronic equipment, in which a network topology information (TI) frame is loaded in a payload of a media access control (MAC) layer frame for transmission. Hence, the devices in the network need not to perform IP communications, and no encapsulation processing is needed, so that transmission modes of the TI information are more flexible, the devices in the network are less constrained, and operating loads of the devices may be lowered.

The information transmission method and apparatus of this disclosure are not only applicable to household networks, but also applicable to other network environments.

According to a first aspect of the embodiments of this disclosure, there is provided an information transmission apparatus, used for transmitting a network topology information frame (TI frame) of network topology information, the apparatus including:

a transmitting/receiving unit configured to transmit and/or receive a media access control (MAC) layer frame of a network protocol; wherein, the network topology information frame (TI frame) is loaded into a payload of the MAC layer frame.

According to a second aspect of the embodiments of this disclosure, there is provided an information transmission method, used for transmitting a network topology information frame (TI frame) of network topology information, the method including:

transmitting and/or receiving a media access control (MAC) layer frame; wherein the network topology information frame (TI frame) is loaded into a payload of the MAC layer frame.

According to a third aspect of the embodiments of this disclosure, there is provided electronic equipment, including the apparatus as described in the second aspect.

An advantage of the embodiments of this disclosure exists in that a network topology information (TI) frame is loaded in a payload of a media access control (MAC) layer frame for transmission. Hence, the devices in the network need not to perform IP communications, and no encapsulation processing is needed, so that transmission modes of the TI information are more flexible, the devices in the network are less constrained, and operating loads of the devices may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings, and these embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communications network" or "wireless communications network" may refer to a network of any one of the following communications standards: wireless fidelity (Wi-Fi), ZigBee, IPv6 over low power wireless personal area networks (6LoWPAN), and Bluetooth, etc.

And communications between devices in a communications system may be performed according to communications protocols at any stage, which may, for example, include but not limited to the following communications protocols: IEEE 802.11, IEEE 802.15.4, Bluetooth SIG (Bluetooth special interest group), etc., and/or other communications protocols that are currently known or will be developed in the future.

In the embodiments of this disclosure, the term "network equipment", for example, refers to a device in a communications system that accesses a terminal device to the communications network and provides services for the terminal device. The network equipment may include but not limited to the following devices: an access point (AP), a wireless router, a ZigBee coordinator, and a ZigBee router, etc.

User equipment may include but not limited to the following devices: a machine-type communications (MTC) terminal, a vehicle mounted communications terminal, a device to device (D2D) terminal, and a machine to machine (M2M) terminal, etc.

For another example, in a scenario of mobile communications, etc., the user equipment may also be a cellular phone, a personal digital assistant (PDA), a wireless modem, a wireless communications device, a hand-held device, a machine-type communications device, a laptop, a cordless telephone, a smart mobile phone, a smart watch, and a digital camera, etc.

Embodiment 1

Embodiment 1 of this disclosure provides an information transmission apparatus, used for transmitting a network topology information frame (TI frame) of network topology information.

Figure 1:
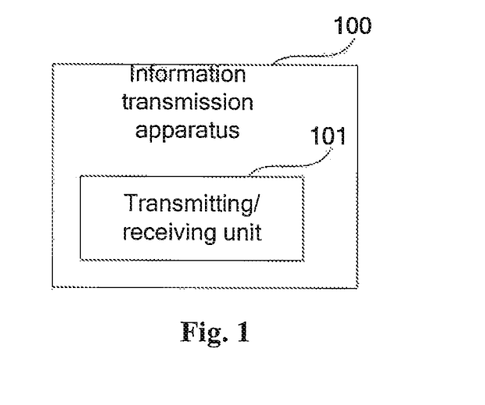
FIG. 1 is a schematic diagram of the information transmission apparatus of Embodiment 1.

FIG. 1 is a schematic diagram of the information transmission apparatus of the embodiment. As shown in FIG. 1, the information transmission apparatus 100 includes a transmitting/receiving unit 101.

In this embodiment, the transmitting/receiving unit 101 is able to transmit and/or receive a media access control (MAC) layer frame of a network protocol. The network topology information frame (TI frame) is loaded into a payload of the MAC layer frame.

According to this embodiment, a network topology information (TI) frame may be loaded into the payload of the MAC layer frame for transmission. Hence, the devices in the network need not to perform IP communications, and no encapsulation processing is needed, so that transmission modes of the TI information are more flexible, the devices in the network are less constrained, and operating loads of the devices may be lowered.

In this embodiment, the devices in the network may acquire the topology information in the network via the MAC layer frame, so as to determine the topology of the network. As the MAC layer frame may be transmitted between lower layer systems of the network, the topology information in the network may be acquired with no need of intervention of a higher layer system, thereby increasing flexibility of network configuration.

Figure 2:
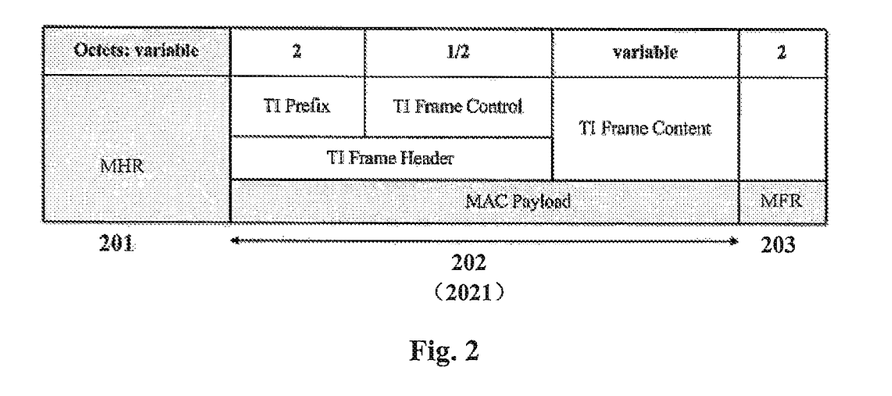
FIG. 2 is a schematic diagram of a frame structure of an MAC layer frame loaded with a network topology information frame in this embodiment.

FIG. 2 is a schematic diagram of a frame structure of an MAC layer frame loaded with a network topology information frame in this embodiment. As shown in FIG. 2, the MAC layer frame 200 may include a frame header 201 (MHR), a payload 202 (MAC payload) and a frame tail 203 (MFR).

In this embodiment, the number of bytes of the frame header 201 is variable (i.e. including octets of a variable number), the number of bytes of the frame trailer 203 is 2 (i.e. including two octets), and the number of bytes of the payload 202 is variable.

In this embodiment, the MAC layer frame may be an MAC layer frame in the IEEE 802.15.4 protocol, or may be an MAC layer frame in other protocols, and this embodiment is not limited thereto.

In this embodiment, reference may be made to the related art for explanation of the frame header 201 and the frame trailer 203 of the MAC layer frame 200, which shall not be described herein any further.

As shown in FIG. 2, the payload 202 of the MAC layer frame 200 may contain a network topology information (TI) frame 2021.

In this embodiment, the network topology information (TI) frame 2021 may include a network topology information frame header (TI frame header) and network topology information frame content (TI frame content).

In this embodiment, the network topology information frame header (TI frame header) is used to indicate the network topology information transmitted by the network topology information frame, and the network topology information frame content (TI frame contents) may describe contents of the network topology information based on indication of the network topology information frame header.

As shown in FIG. 2, in this embodiment, the network topology information frame header (TI frame header) may include a network topology information frame prefix (TI prefix) and network topology information frame control (TI frame control) information.

In this embodiment, the network topology information frame prefix (TI prefix) may be used to indicate that the network topology information frame is used to transmit network topology information, and the network topology information frame control (TI frame control) information is at least used to indicate existence and sequence of contents of the network topology information described by the network topology information frame content.

In this embodiment, the network topology information frame contents may include information on the devices in the network, and/or link information between the devices, etc.

In this embodiment, the network topology information frame prefix (TI frame prefix) may include at least two octets; wherein at least one octet denotes that the frame 2021 is not a low-power wireless personal area network (LoWPAN) frame, and the other at least one octet denotes that the frame is a network topology information frame (TI frame), or, the at least two octets may be jointly used to denote that the frame 2021 is a network topology information frame (TI frame).

Figure 3:
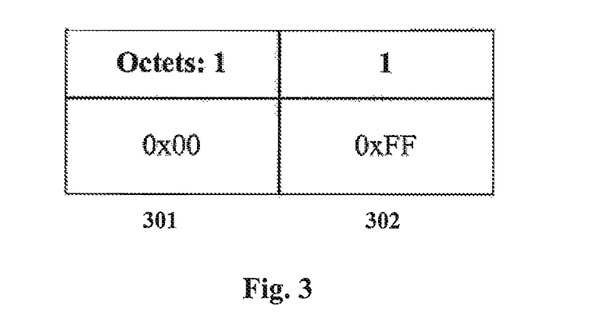
FIG. 3 is a schematic diagram of a network topology information frame prefix in this embodiment.

FIG. 3 is a schematic diagram of the network topology information frame prefix in this embodiment. As shown in FIG. 3, the network topology information frame prefix (TI frame prefix) may include two octets. One octet 301 denotes that the frame is not an LoWPAN frame, and the other octet 302 denotes that the frame is a network topology information frame (TI frame).

In this embodiment, the octet 301 may be 00xxxxxx, denoting that the frame is not an LoWPAN frame. For example, as shown in FIG. 3, the octet 301 may be 0x00.

In this embodiment, as shown in FIG. 3, the octet 302 may be 0xFF. However, this embodiment is not limited thereto, and the octet 302 may also be of other values.

Furthermore, in this embodiment, the octet 301 in FIG. 3 may be immediately after the frame header 201 of the MAC layer frame 200. However, this embodiment is not limited thereto, and the octet 301 and the frame header 201 of the MAC layer frame 200 may also be spaced apart by at least one bit.

Furthermore, in this embodiment, the octet 302 may be located before the octet 302. However, this embodiment is not limited thereto, and at least one octet denoting that the frame 2021 is not an LoWPAN frame may be located after at least one octet denoting that the frame is a network topology information frame (TI frame).

In this embodiment, the network topology information frame control (TI frame control) information may include control bits and an append bit. The control bits are used to respectively indicate existence of contents of the network topology information, and an order of the control bits is used to indicate an order of the contents of the network topology information frame; and the append bit is used to indicate whether the network topology information frame control (TI frame control) information is extended.

In this embodiment, when the append bit indicates that the network topology information frame control (TI frame control) information is extended, a next byte of the append bit may include at least one control bit.

In this embodiment, an unextended topology information frame control (TI frame control) information may occupy one octet, and an extended topology information frame control (TI frame control) information may occupy two octets. Hence, as shown in FIG. 2, the topology information frame control (TI frame control) information may occupy one or two octets.

Furthermore, in this embodiment, the number of the bits occupied by the topology information frame control (TI frame control) information may not be limited thereto, only if the extended topology information frame control (TI frame control) information occupies more bits than the unextended topology information frame control (TI frame control) information.

Figure 4:
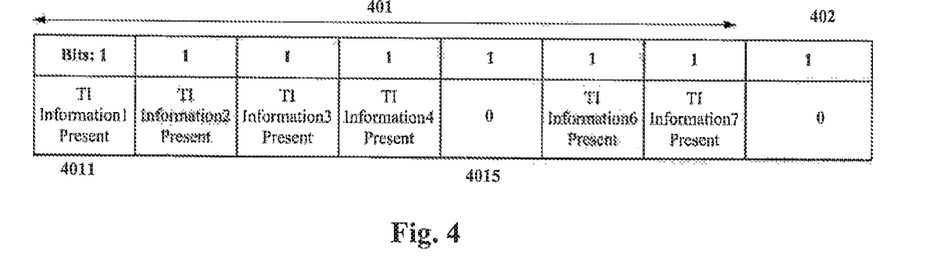
FIG. 4 is a schematic diagram of unextended topology information frame control information in this embodiment.

FIG. 4 is a schematic diagram of the unextended topology information frame control information in this embodiment.

As shown in FIG. 4, an unextended topology information frame control (TI frame control) information may occupy one octet, i.e., 8 bits. The former 7 bits are all control bits 401, each of the 7 bits being able to be used for indicating whether there a content is present in the network topology information frame contents corresponding to the bit, data of each bit being "1" or "0", "1" denoting that the content corresponding to the bit is present in the network topology information frame contents, and "0" denoting that the content corresponding to the bit is not present in the network topology information frame contents. For example, data of a bit 4011 may be "1", denoting that a corresponding content, information 1, is present in the network topology information frame contents, and data of a bit 4015 may be "0", denoting that a corresponding content (such as information 5) is not present in the network topology information frame contents.

As shown in FIG. 4, in this embodiment, the eighth bit of the topology information frame control (TI frame control) information may be an append bit 402, data of the bit 402 being "0" denoting that the topology information frame control (TI frame control) information is not extended. And furthermore, if data of the bit 402 is "1", it denotes that the topology information frame control (TI frame control) information is extended.

It is shown by the topology information frame control (TI frame control) information in FIG. 4 that in the topology information frame content (TI frame content), contents information 1, information 2, information 3, information 4, information 6, and information 7, shall be described in turn.

Furthermore, in FIG. 4, "1" in the first row denotes that fields in the second row occupy one bit.

Figure 5:
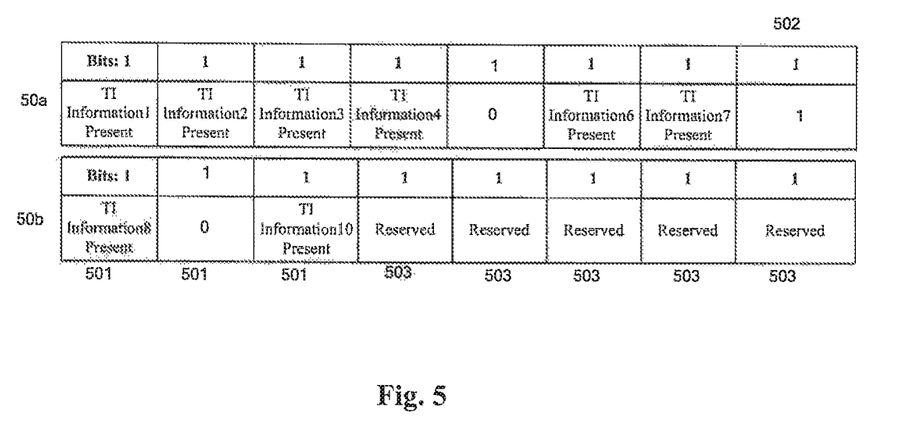
FIG. 5 is a schematic diagram of extended topology information frame control information in this embodiment.

FIG. 5 is a schematic diagram of the extended topology information frame control information in this embodiment. As shown in FIG. 5, the extended topology information frame control (TI frame control) information may occupy two octets, i.e. 16 bits. A data structure of a first octet 50*a* is identical to that shown in FIG. 4. In FIG. 5, data of an append bit 502 being "1" denotes that the topology information frame control (TI frame control) information is extended.

In a second octet 50*b* in FIG. 5, at least one control bit 501 may be included, and other bits 503 in the second octet 50*b* may be reserved.

It is shown by the topology information frame control (TI frame control) information that in the topology information frame content (TI frame content), contents information 1, information 2, information 3, information 4, information 6, information 7, information 8, and information 10, shall be described in turn.

Furthermore, in FIG. 5, the respective "1" in 50*a* and 50*b* denotes that fields in the second row occupy one bit.

Figure 6:
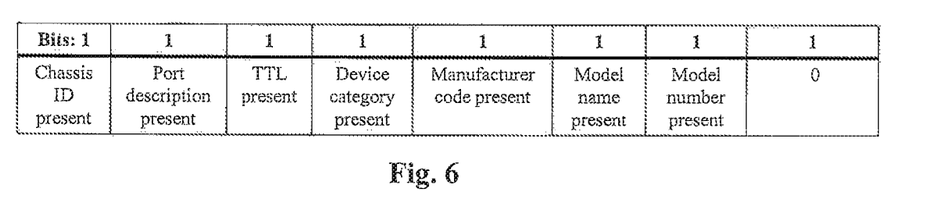
FIG. 6 is a schematic diagram of an example of the unextended topology information frame control information in this embodiment.
Figure 7:
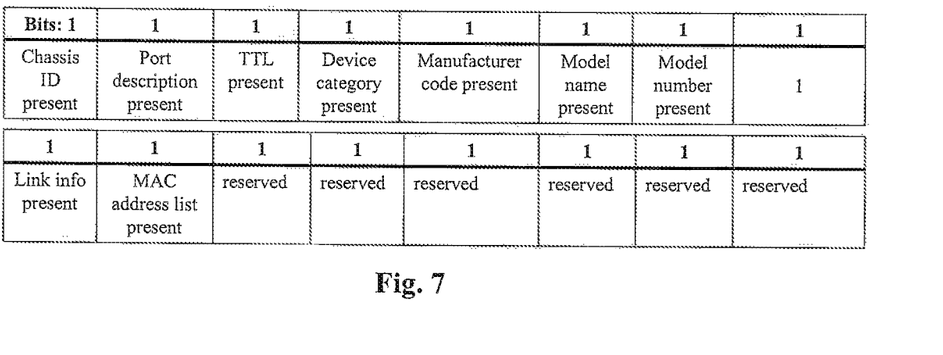
FIG. 7 is a schematic diagram of an example of the extended topology information frame control information in this embodiment.

FIG. 6 is a schematic diagram of an example of the unextended topology information frame control information in this embodiment, and FIG. 7 is a schematic diagram of an example of the extended topology information frame control information in this embodiment, FIG. 6 and FIG. 7 being examples of FIG. 4 and FIG. 5, respectively.

In FIGS. 6 and 7, meanings of the contents are as follows: Chassis ID may denote an ID of a device to which the network topology information frame corresponds, Port description may denote information describing a port of the device, TTL denotes a time to live (TTL) value of the device, Device category denotes a category of the device, Manufacturer code denotes a code of a manufacturer of the device, Model name denotes a brand, a model or series granted by the manufacturer for the device, Model number denotes a code granted by the manufacturer for the device, Link information denotes information on an MAC forwarding table of the device, and MAC address list denotes an MAC address list of ports of network equipment.

The topology information frame control information in FIGS. 6 and 7 indicates an order of the contents (such as Chassis ID, etc.) in the topology information frame content (TI frame content), and by setting the data of the control bits of the topology information frame control information in FIGS. 6 and 7 to be "1" or "0", whether a content to which the control bit corresponds is present in the topology information frame content (TI frame content) may be indicated.

In this embodiment, reference may be made to the related art for structures of the topology information frame content (TI frame content), which shall not be described herein any further.

In this disclosure, with the structure of the network topology information frame 2021, the contents described by the frame content and an order of description may be indicated in the frame header, which may reduce waste of resources of the network topology information frame 2021. On the contrary, in a case where a TLV (type, length, value) frame structure is used, even though a network topology information frame does not describe a content in TI, a bit to which the content corresponds needs to be reserved in the network topology information frame, hence, resources of the network topology information frame are wasted.

In this embodiment, the information transmission apparatus may be provided in network equipment or a terminal.

In this embodiment, the network equipment may have two or more ports, the network equipment may receive information from at least one of the ports, and forward the received information via the other the at least one port.

In this embodiment, the terminal may be located at a boundary of the network, and may perform information transmission or reception, but it is unable to forward the received information.

In this embodiment, the network topology information frame may correspond to a device in the network, that is, for different devices in the network, network topology information frames (TI frames) corresponding to the devices may be transmitted, and network topology information on the devices are described by the network topology information frames (TI frames). Furthermore, when the device is network equipment, a network topology information frame (TI frame) to which it corresponds may contain extended network topology information frame control (TI frame control) information; and when the device is a terminal, a network topology information frame (TI frame) to which it corresponds may contain unextended network topology information frame control (TI frame control) information.

Embodiment 2

Embodiment 2 provides an information transmission method, used for transmitting a network topology information frame (TI frame) of network topology information.

Figure 8:
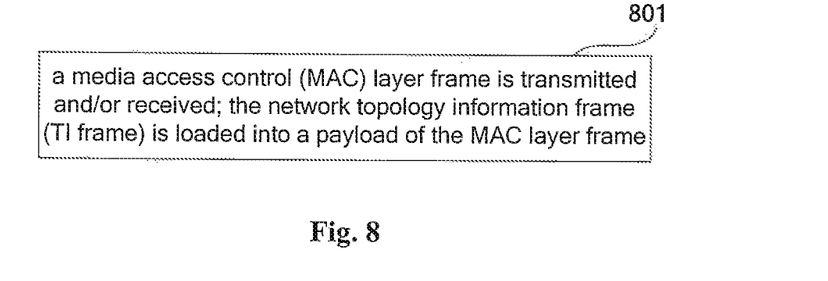
FIG. 8 is a flowchart of the information transmission method of Embodiment 2.

FIG. 8 is a flowchart of the information transmission method of this embodiment. As shown in FIG. 8, the information transmission method includes:

step 801: a media access control (MAC) layer frame is transmitted and/or received; the network topology information frame (TI frame) is loaded into a payload of the MAC layer frame.

The description of the corresponding unit in Embodiment 1 may be referred to for description of step 801.

The corresponding description in Embodiment 1 may be referred to for description of the MAC layer frame and the network topology information frame (TI frame).

According to this embodiment, a network topology information (TI) frame may be loaded into the payload of the MAC layer frame for transmission. Hence, the devices in the network need not to perform IP communications, and no encapsulation processing is needed, so that transmission modes of the TI information are more flexible, the devices in the network are less constrained, and operating loads of the devices may be lowered.

Furthermore, according to the structure of the network topology information frame, the contents described by the TI frame contents and an order of description may be indicated in the frame header, which may reduce waste of resources of the network topology information frame.

Embodiment 3

Embodiment 3 of this disclosure provides electronic equipment, which may be network equipment, or may be a terminal. As a principle of the equipment for solving problems is similar to that of the method in Embodiment 1, the implementation of the method in Embodiment 1 may be referred to for implementation of the equipment, with identical contents being not going to be described herein any further.

Figure 9:
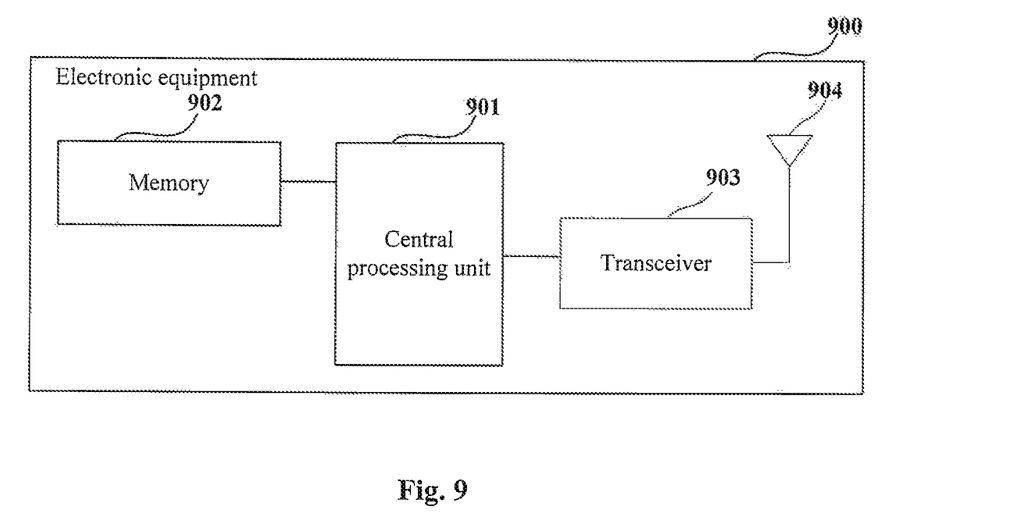
FIG. 9 is a schematic diagram of the electronic equipment of Embodiment 3.

FIG. 9 is a schematic diagram of a structure of the electronic equipment of the embodiment of the present disclosure. As shown in FIG. 9, the electronic equipment 900 may include a central processing unit (CPU) 901 and a memory 902, the memory 902 being coupled to the central processing unit 901. For example, the memory 902 may store various data, and furthermore, it may store a program for information processing, and execute the program under control of the central processing unit 901, so as to transmit indication information.

In one implementation, the functions of the information transmission apparatus 100 may be integrated into the central processing unit 901. For example, the central processing unit 901 may be configured to perform control to carry out the information transmission method in Embodiment 2.

For example, the central processing unit 901 may be configured to: transmit and/or receive a media access control (MAC) layer frame of a network protocol; wherein, the network topology information frame (TI frame) is loaded into a payload of the MAC layer frame.

In this implementation, the network topology information frame (TI frame) may include:

a network topology information frame header (TI frame header), which is used to indicate the network topology information transmitted by the network topology information frame; and network topology information frame content (TI frame content), which is used to describe contents of the network topology information based on indication of the network topology information frame header.

In this implementation, the network topology information frame header may include:

a network topology information frame prefix (TI prefix), which is used to indicate that the network topology information frame is used to transmit network topology information; and network topology information frame control (TI frame control) information, which is used to indicate existence and sequence of contents of the network topology information described by the network topology information frame content.

In this implementation, the network topology information frame prefix (TI frame prefix) includes at least two octets; at least one octet denotes that the frame is not a low-power wireless personal area network (LoWPAN) frame, and the other at least one octet denotes that the frame is a network topology information frame (TI frame).

In this implementation, the octet denoting that the frame is not a LoWPAN frame is 0x00; and the octet denoting that the frame is a network topology information frame (TI frame) is 0xFF.

In this implementation, the network topology information frame control (TI frame control) information includes control bits and an append bit; the control bits are used to respectively indicate existence of contents of the network topology information, and an order of the control bits is used to indicate an order of the contents of the network topology information frame; and the append bit is used to indicate whether the network topology information frame control information is extended.

In this implementation, when the append bit indicates that the network topology information frame control (TI frame control) information is extended, a next byte of the append bit at least includes one control bit.

In another implementation, the apparatus 100 and the central processing unit 901 may be configured separately. For example, the apparatus 100 may be configured as a chip connected to the central processing unit 901, such as a unit shown in FIG. 9, with its functions being realized under control of the central processing unit 901.

Furthermore, as shown in FIG. 9, the electronic equipment 900 may further include a transceiver 903, and an antenna 904, etc. Functions of the above components are similar to those in the related art, and shall not be described herein any further. It should be noted that the electronic equipment 900 does not necessarily include all the parts shown in FIG. 9, and furthermore, the electronic equipment 900 may include parts not shown in FIG. 9, and the related art may be referred to.

An embodiment of the present disclosure provides a computer readable medium, including a computer readable program code, which will cause an information transmission apparatus or electronic equipment to carry out the information transmission method as described in Embodiment 2.

An embodiment of the present disclosure provides a computer readable program code, which, when executed in an information transmission apparatus or electronic equipment, will cause the information transmission apparatus or the electronic equipment to carry out the information transmission method as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method in the apparatus described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An information transmission apparatus, used for transmitting a network topology information frame (TI frame) of network topology information, the apparatus comprising:

a transmitting/receiving unit configured to transmit and/or receive a media access control (MAC) layer frame of a network protocol; wherein, the network topology information frame (TI frame) is loaded into a payload of the MAC layer frame.

Supplement 2. The apparatus according to supplement 1, wherein the network topology information frame (TI frame) comprises:

a network topology information frame header (TI frame header), which is used to indicate the network topology information transmitted by the network topology information frame; and network topology information frame content (TI frame content), which is used to describe contents of the network topology information based on indication of the network topology information frame header.

Supplement 3. The apparatus according to supplement 2, wherein the network topology information frame header comprises:

a network topology information frame prefix (TI prefix), which is used to indicate that the network topology information frame is used to transmit network topology information; and network topology information frame control (TI frame control) information, which is used to indicate existence and sequence of contents of the network topology information described by the network topology information frame content.

Supplement 4. The apparatus according to supplement 3, wherein the network topology information frame prefix (TI frame prefix) comprises:

at least two octets; wherein at least one octet denotes that the frame is not a low-power wireless personal area network (LoWPAN) frame, and the other at least one octet denotes that the frame is a network topology information frame (TI frame).

Supplement 5. The apparatus according to supplement 4, wherein, the octet denoting that the frame is not a LoWPAN frame is 0x00; and the other octet denoting that the frame is a network topology information frame (TI frame) is 0xFF.

Supplement 6. The apparatus according to supplement 3, wherein the network topology information frame control (TI frame control) information comprises control bits and an append bit; wherein the control bits are used to respectively indicate existence of contents of the network topology information, and an order of the control bits is used to indicate an order of the contents of the network topology information frame;

and the append bit is used to indicate whether the network topology information frame control information is extended.

Supplement 7. The apparatus according to supplement 6, wherein when the append bit indicates that the network topology information frame control (TI frame control) information is extended, a next byte of the append bit comprises at least one control bit.

Supplement 8. Electronic equipment, comprising the information transmission apparatus as described in any one of supplements 1-7.

Supplement 9. An information transmission method, used for transmitting a network topology information frame (TI frame) of network topology information, the method comprising:

transmitting and/or receiving a media access control (MAC) layer frame; wherein the network topology information frame (TI frame) is loaded into a payload of the MAC layer frame.

Supplement 10. The method according to supplement 9, wherein the network topology information frame (TI frame) comprises:

a network topology information frame header (TI frame header), which is used to indicate the network topology information transmitted by the network topology information frame; and network topology information frame content (TI frame content), which are used to describe contents of the network topology information based on indication of the network topology information frame header.

Supplement 11. The method according to supplement 10, wherein the network topology information frame header comprises:

a network topology information frame prefix (TI prefix), which is used to indicate that the network topology information frame is used to transmit network topology information; and network topology information frame control (TI frame control) information, which is used to indicate existence and sequence of contents of the network topology information described by the network topology information frame content.

Supplement 12. The method according to supplement 11, wherein the network topology information frame prefix (TI frame prefix) comprises at least two octets; wherein at least one octet denotes that the frame is not a low-power wireless personal area network (LoWPAN) frame, and the other at least one octet denotes that the frame is a network topology information frame (TI frame).

Supplement 13. The method according to supplement 12, wherein, the octet denoting that the frame is not a LoWPAN frame is 0x00; and the other octet denoting that the frame is a network topology information frame (TI frame) is 0xFF.

Supplement 14. The method according to supplement 11, wherein the network topology information frame control (TI frame control) information comprises control bits and an append bit; wherein the control bits are used to respectively indicate existence of contents of the network topology information, and an order of the control bits is used to indicate an order of the contents of the network topology information frame;

and the append bit is used to indicate whether the network topology information frame control information is extended.

Supplement 15. The method according to supplement 14, wherein when the append bit indicates that the network topology information frame control (TI frame control) information is extended, a next byte of the append bit comprises at least one control bit.

The invention claimed is:

1. An information transmission apparatus, used for transmitting a network topology information frame (TI frame) of network topology information, the apparatus comprising:
   a transmitting/receiving unit configured to transmit and/or receive a media access control (MAC) layer frame of a network protocol; wherein, the network topology information frame (TI frame) is loaded into a payload of the MAC layer frame; and
   wherein the network topology information frame (TI frame) comprises:
   a network topology information frame header (TI frame header), which is used to indicate the network topology information transmitted by the network topology information frame;
   network topology information frame content (TI frame content), which is used to describe contents of the network topology information based on indication of the network topology information frame header; and
   wherein the network topology information frame header comprises:
   a network topology information frame prefix (TI prefix), which is used to indicate that the network topology information frame is used to transmit network topology information;
   network topology information frame control (TI frame control) information, which is used to indicate existence and sequence of contents of the network topology information described by the network topology information frame content;
   wherein the network topology information frame prefix (TI frame prefix) comprises at least two octets; and
   wherein at least one octet denotes that the frame is not a low-power wireless personal area network (LoWPAN) frame, and the other at least one octet denotes that the frame is a network topology information frame (TI frame).

2. The apparatus according to claim 1, wherein, the octet denoting that the frame is not a LoWPAN frame is 0x00; and the other octet denoting that the frame is a network topology information frame (TI frame) is 0xFF.

3. The apparatus according to claim 1, wherein the network topology information frame control (TI frame control) information comprises control bits and an append bit; wherein the control bits are used to respectively indicate existence of contents of the network topology information, and an order of the control bits is used to indicate an order of the contents of the network topology information frame; and
   the append bit is used to indicate whether the network topology information frame control information is extended.

4. The apparatus according to claim 3, wherein when the append bit indicates that the network topology information frame control (TI frame control) information is extended, a next byte following the append bit comprises at least one control bit.

5. Electronic equipment, comprising the information transmission apparatus as described in claim 1.

6. An information transmission method, used for transmitting a network topology information frame (TI frame) of network topology information, the method comprising:
   transmitting and/or receiving a media access control (MAC) layer frame; wherein the network topology information frame (TI frame) is loaded into a payload of the MAC layer frame; and
   wherein the network topology information frame (TI frame) comprises:
   a network topology information frame header (TI frame header), which is used to indicate the network topology information transmitted by the network topology information frame;
   network topology information frame content (TI frame content), which are used to describe contents of the network topology information based on indication of the network topology information frame header; and
   wherein the network topology information frame header comprises:
   a network topology information frame prefix (TI prefix), which is used to indicate that the network topology information frame is used to transmit network topology information;
   network topology information frame control (TI frame control) information, which is used to indicate existence and sequence of contents of the network topology information described by the network topology information frame content;
   wherein the network topology information frame prefix (TI frame prefix) comprises at least two octets; and
   wherein at least one octet denotes that the frame is not a low-power wireless personal area network (LoWPAN) frame, and the other at least one octet denotes that the frame is a network topology information frame (TI frame).

7. The method according to claim 6, wherein, the octet denoting that the frame is not a LoWPAN frame is 0x00; and the other octet denoting that the frame is a network topology information frame (TI frame) is 0xFF.

8. The method according to claim 6, wherein the network topology information frame control (TI frame control) information comprises control bits and an append bit; wherein the control bits are used to respectively indicate existence of contents of the network topology information, and an order of the control bits is used to indicate an order of the contents of the network topology information frame; and
   the append bit is used to indicate whether the network topology information frame control information is extended.

9. The method according to claim 8, wherein when the append bit indicates that the network topology information frame control (TI frame control) information is extended, a next byte following the append bit comprises at least one control bit.

10. The apparatus according to claim 1, wherein the TI prefix occupies two octets; and the TI frame control information occupies one or two octets.

11. The method according to claim 6, wherein the TI prefix occupies two octets; and the TI frame control information occupies one or two octets.

* * * * *